(12) United States Patent
Homann et al.

(10) Patent No.: US 7,108,299 B2
(45) Date of Patent: Sep. 19, 2006

(54) LATCH FOR A TOP OF A VEHICLE

(75) Inventors: Bodo Homann, Heimsheim (DE); Horst Schmidt, Stuttgart (DE); Markus Kuestner, Ludwigsburg (DE); Thomas Schneider, Esslingen (DE)

(73) Assignee: Beatrix Gross, Aichwald (DE)

( * ) Notice: Subject to any disclaimer, the term of this patent is extended or adjusted under 35 U.S.C. 154(b) by 214 days.

(21) Appl. No.: 10/753,571

(22) Filed: Jan. 8, 2004

(65) Prior Publication Data

US 2004/0155469 A1     Aug. 12, 2004

(30) Foreign Application Priority Data

Jan. 13, 2003  (DE) .............................. 103 00 882

(51) Int. Cl.
*E05C 3/06*      (2006.01)
(52) U.S. Cl. ........................................ 292/201; 296/121
(58) Field of Classification Search ............... 292/216, 292/201; 296/121
See application file for complete search history.

(56) References Cited

U.S. PATENT DOCUMENTS

| 5,284,378 A | 2/1994 | Sautter, Jr. |
|---|---|---|
| 5,868,454 A | 2/1999 | Homann et al. |
| 6,158,786 A | 12/2000 | Droste et al. |
| 6,837,535 B1 * | 1/2005 | Plesternings .................. 296/121 |
| 2002/0021021 A1 | 2/2002 | Schütt et al. |

FOREIGN PATENT DOCUMENTS

| DE | 195 33 802 C1 | 3/1997 |
|---|---|---|
| DE | 197 21 229 A1 | 11/1998 |
| DE | 100 00 002 A1 | 7/2001 |
| DE | 101 05 771 A1 | 9/2002 |

* cited by examiner

*Primary Examiner*—Gary Estremsky
(74) *Attorney, Agent, or Firm*—Walter A. Hackler (57) ABSTRACT

A latch (1) for a top of a vehicle comprises a latching hook (3) which is disposed in a guide plate (10), preferably having a U-shaped cross-section, to be movable from a closed position into an open position on a defined path (41) via guiding means (bolt 8, pin 9). A geared motor (4) is provided for pivoting a actuation lever (15) which is connected to the latching hook (3). The connection between the latching hook (3) and the actuation lever (15) is realized through several levers (11, 12, 13) which are connected to each other in an hinged fashion. The motor-driven latch for a top with compact space-saving structure, has a latching hook with a larger radius of motion to increase the separation from the windscreen frame in the open position.

4 Claims, 8 Drawing Sheets

LATCH FOR A TOP OF A VEHICLE

PRIOR ART

The present invention relates to a latch for a top of a vehicle with a latching hook which is disposed on a link plate—with a preferably U-shaped cross-section—to be movable on a defined path from a closed position to an open position via guiding means, wherein a geared motor is provided for pivoting a actuation lever which is connected to the latching hook.

A latch for a top of this type is disclosed e.g. in DE 197 21 229 A1.

Top closures with geared motor are used for automatic closing and opening of the folding top of convertibles. The conventional guidance of the latching hook in the link permits a defined motor-driven motion of the latching hook by means of the geared motor. The latch for a top has a compact configuration to obtain a construction which requires little space.

OBJECT OF THE INVENTION

It is the underlying purpose of the invention to further develop a motor-driven latch for a top with compact structure reducing the space requirements such that the latching hook has a larger radius of motion to obtain a larger separation between latching hook and windscreen frame in the open position.

SUBJECT MATTER AND ADDVANTAGES OF THE INVENTION

This object is achieved by a latch for a top of the above-mentioned type wherein the connection between latching hook and actuation lever is provided by several levers which are connected to each other in an hinged fashion. The latching hook is not directly connected to the actuation lever but through several levers of an hinged lever connection which require little space. A defined transmission of force onto the latching hook is still obtained to close the top with tension.

In a further embodiment of the invention, the link plate has two recesses which extend substantially in the longitudinal direction of the latching hook for forming guide paths one of which is provided for guiding the guiding pin and the other for guiding and bearing the guiding pin on the end of the latch for a top facing away from the windscreen frame. The use of two guide paths provides precise motion of the latching hook.

In a preferred embodiment, the first lever is disposed on the side outside of the guide plate and is connected on the one hand to the latching hook and on the other hand to the second lever which is also disposed on the side outside of the guide plate, wherein the second lever is again connected to the actuation lever via the third lever. The latching hook is guided within the guide plate and the means for deflecting the latching hook are disposed outside of the guide plate which has a favourable effect on the space requirements.

The latch for a top of another embodiment is characterized by two first and second levers, disposed on both sides of the guide plate, wherein the third lever is disposed between said levers above the latching hook. The use of two levers disposed on both sides guarantees that the latching hook is always held in the center of the guide and the forces are distributed to two hinged lever arrangements. The stability of the connection and the possibilities of force transmission are improved.

To switch off the latch for a top, the first and/or second levers have steps (stops) for actuating micro switches of a limit stop of the latch for a top in the open position or in the closed position. Means for triggering the limit stop are integrated in the levers and therefore automatically coupled to the motion of the levers. The further elements of the limit stop, e.g. the micro switches, are disposed on a board which carries all elements of the limit stop.

To actuate the latch for a top through a worm gear when the geared motor is defect, the housing of the latch for a top comprises an opening for manual actuation of the worm gear with a tool. The worm gear may have a hexagon socket bore such that the worm gear can be easily driven by a hexagon socket screw.

DRAWING

The drawing shows a preferred embodiment of the invention in a schematic fashion not to be taken to scale, and is explained in more detail below with reference to the figures.

DESCRIPTION OF THE EMBODIMENT

Figure 1:
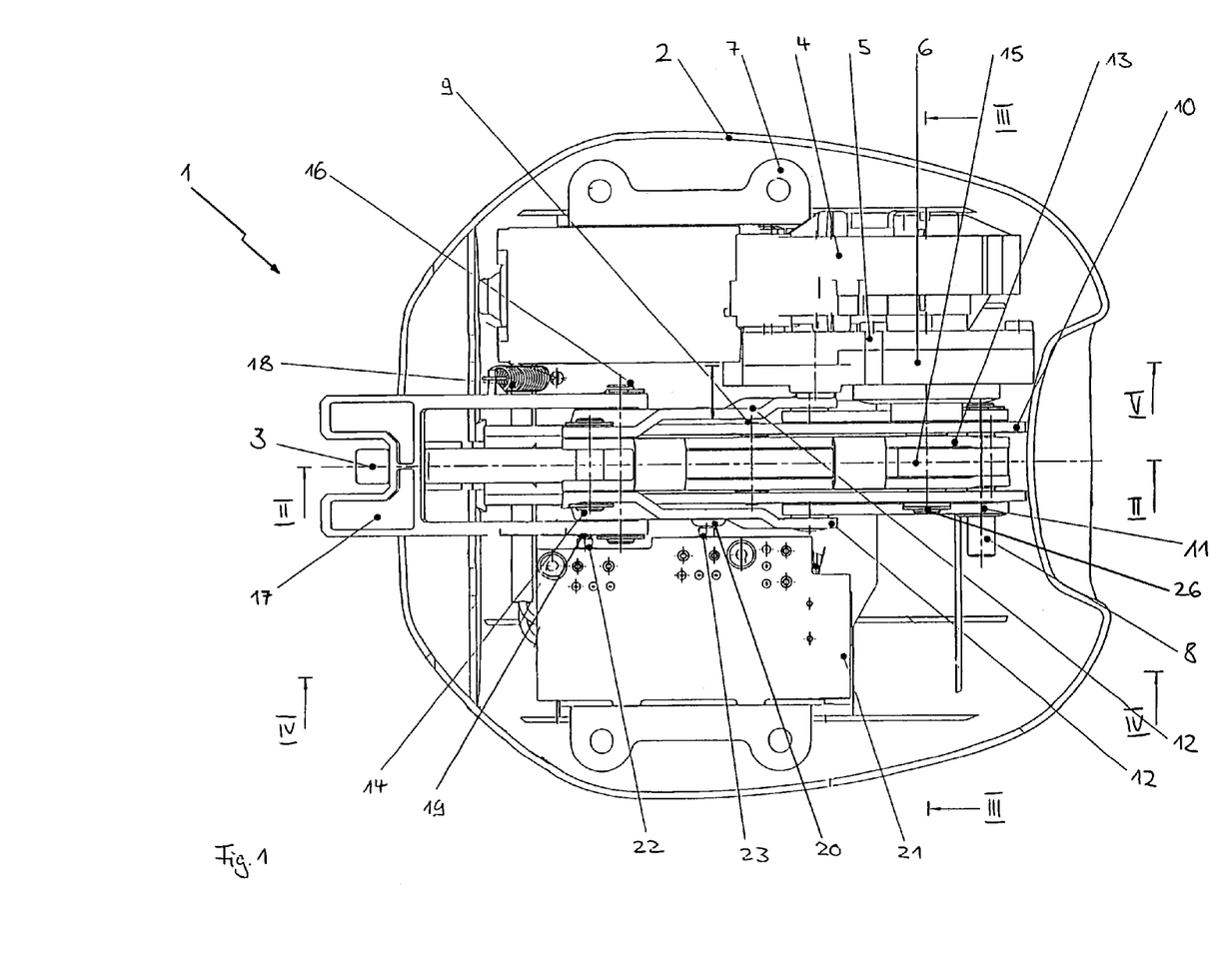
FIG. 1 shows a top view onto a latch for a top, wherein the latching hook assumes its closed position.
Figure 6:
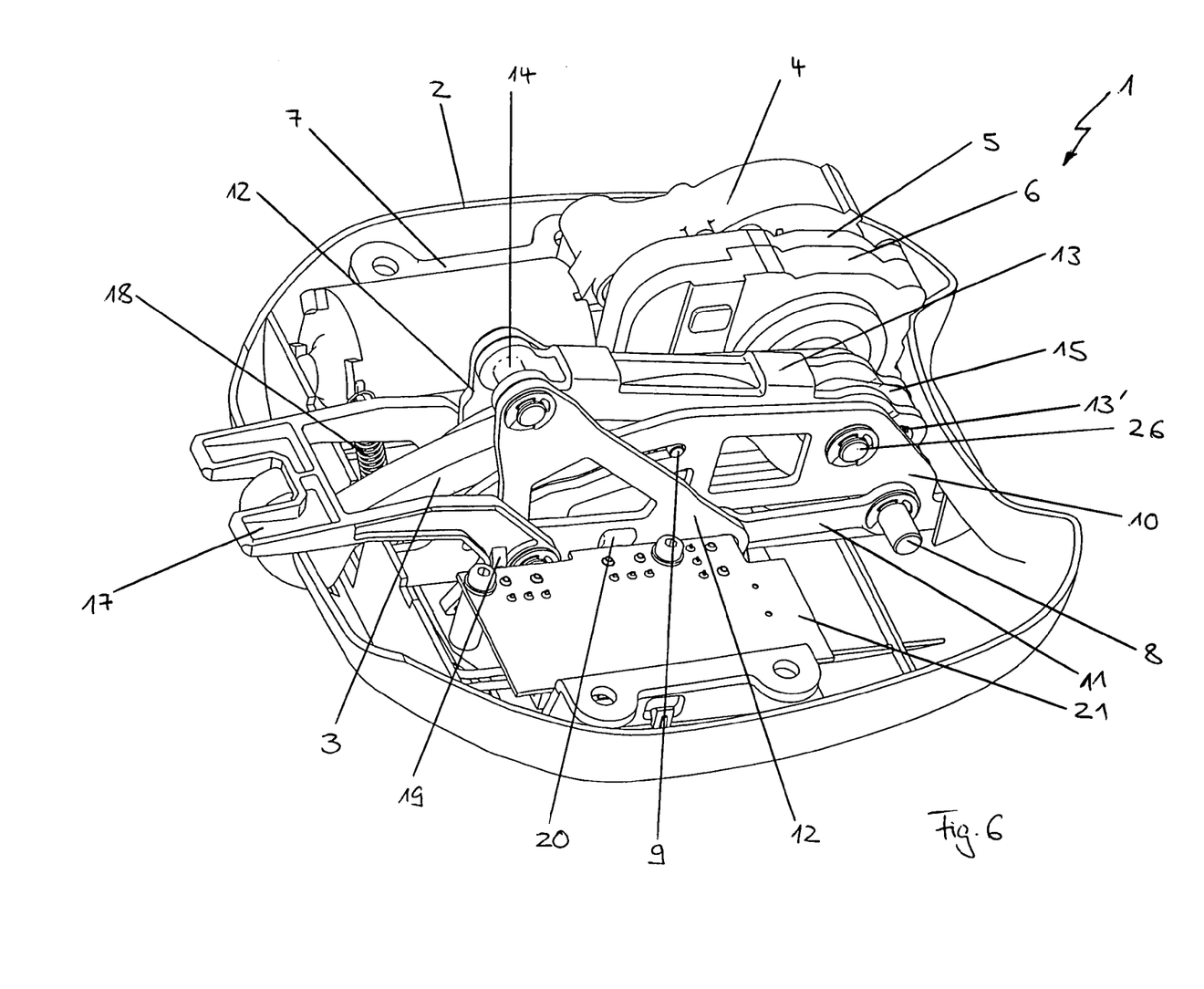
FIG. 6 shows a perspective view of the region of the latch for a top facing the top.

A folding top of a passenger vehicle can be closed by a latch 1 through the releasable attachment to a windscreen frame. FIGS. 1 and 6 show the essential structure of the latch 1 for a top. The latch 1 for a top comprises a housing 2 which can be mounted to the lower side of the dimensionally stable front top frame, a latching hook 3 which, in its locked position, is in operative connection with a windscreen frame and a geared motor 4 with a gear housing 5, 6 for moving the latching hook 3 from the closed position to the open position or vice versa. FIG. 6 shows the upper side of the latch 1 for a top to be mounted to the lower side of the top frame. The top is drawn in the longitudinal direction of the passenger vehicle against the windscreen frame and held in the tensioned top position. The latch 1 for a top can be stationarily fixed to the top frame via a supporting sheet metal 7.

The latching hook 3 is displaceably disposed on its end facing away from the windscreen frame through a guiding bolt 8 and a guiding pin 9 which are inserted into recesses of a guide plate 10. The latching hook 3 can be deflected within the guide plate 10. The design of the recesses predetermines a defined motion of the latching hook 3. The latching hook 3 is moreover connected, in an hinged fashion via first levers 11 and second triangular levers 12 disposed on both sides, and a third centrally disposed lever 13 (axis 14), to a actuation lever which controls the motion of the latching hook 3. The second lever 12 is again rotatably disposed via an axis 16. To move the latching hook 3, the actuation lever 15 is moved through a drive shaft which can be driven by the geared motor 4 such that consequently, the hinged levers 11, 12 and 13 are displaced in a guided fashion towards the windscreen frame and guide the latching hook 3 from the closed position downwards away from the windscreen frame into the open position.

A switching bracket 17 is pivotably disposed on the outer sides of the guide plate 10 above the latching hook 3 (axis 16) which is downwardly drawn by a tension spring 18. When a front top section is moved into the closed position, the switching bracket 17 comes into contact with a section of the windscreen frame disposed in the closed position below the switching bracket 17, and is forced upwardly against the spring force (see also FIGS. 9 and 10). The section of the windscreen frame is clamped between the switching brackets 17 and the latching hook 3.

The switching bracket 17 and the second lever 12 each have a step 19 or 20 which can each trigger a micro switch 22 or 23 disposed on the board 21 to switch off the geared motor 4 in the open position or in the closed position. In a final position of the switching bracket 17 or the lever 12, the steps 19, 20 strike the micro switches 22, 23.

Figure 2:
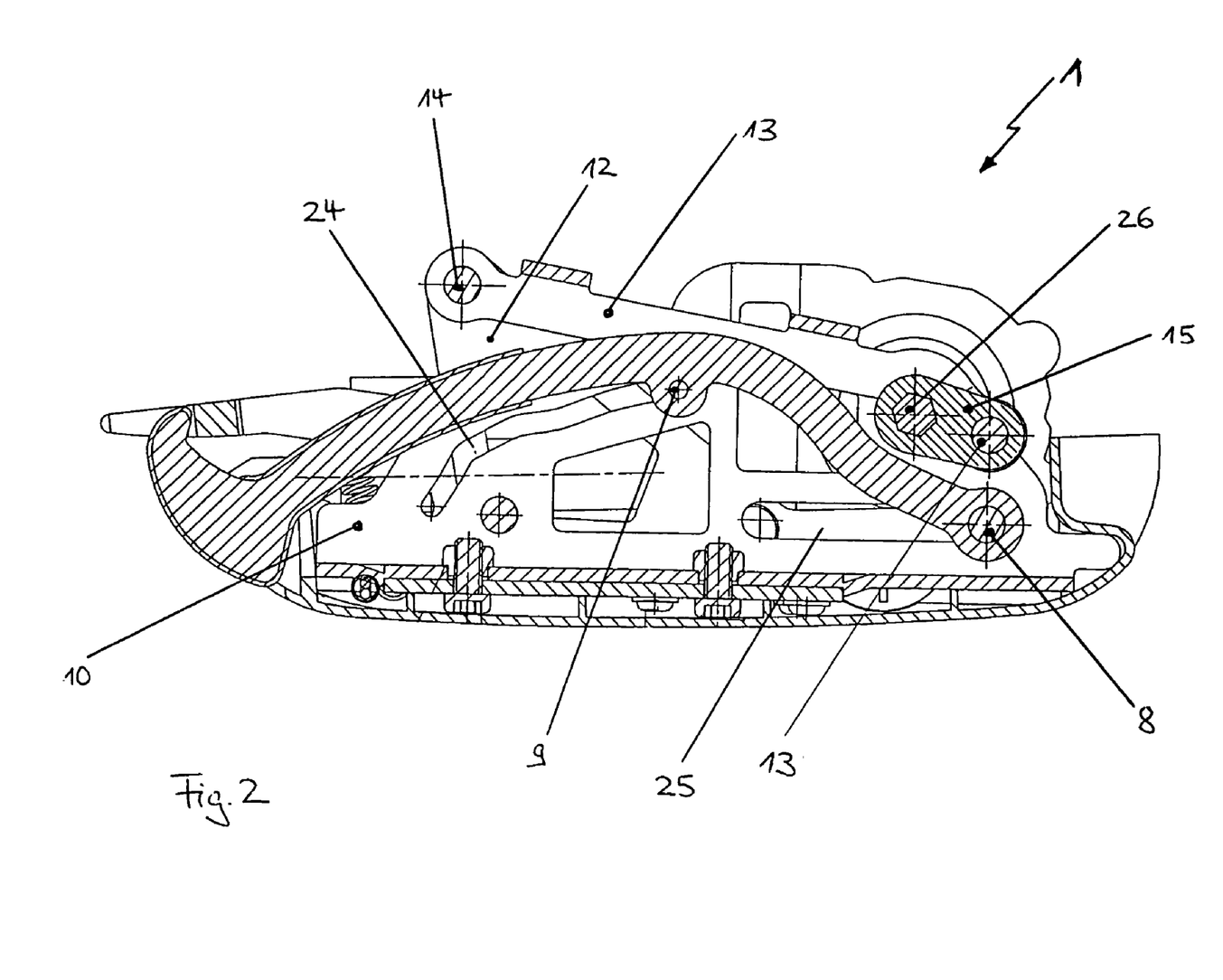
FIG. 2 shows a section according to line II—II of FIG. 1.

As shown in FIG. 2, the latching hook 3 is curved and during its motion is guided via the cylindrical pin 9 and the guiding bolt 8 in recesses 24 and 25 of the guide plate 10 to obtain a motion on a defined path. The actuation lever 15 is disposed on the drive shaft 26 for secure mutual rotation therewith and connected to the lever 13 in an hinged fashion via the cylindrical pin 13'. For this reason, the actuation lever 15 is raised through counter-clockwise rotation, pushes the first lever 13 as well as the second lever 12 in the direction of the windscreen frame and carries along the latching hook 3.

Figure 3:
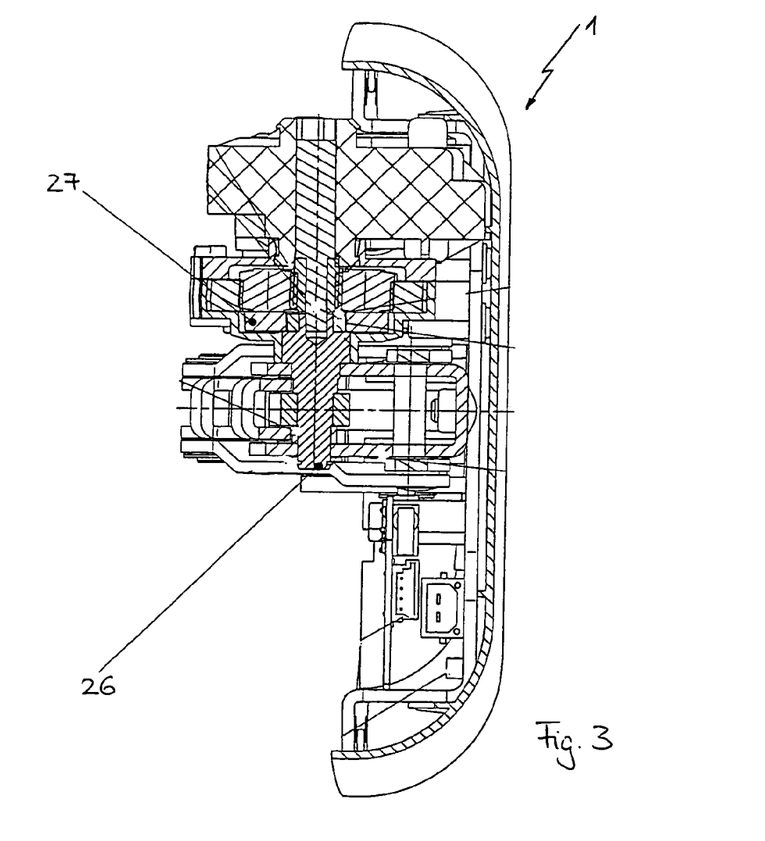
FIG. 3 shows a section according to line III—III of FIG. 1.
Figure 4:
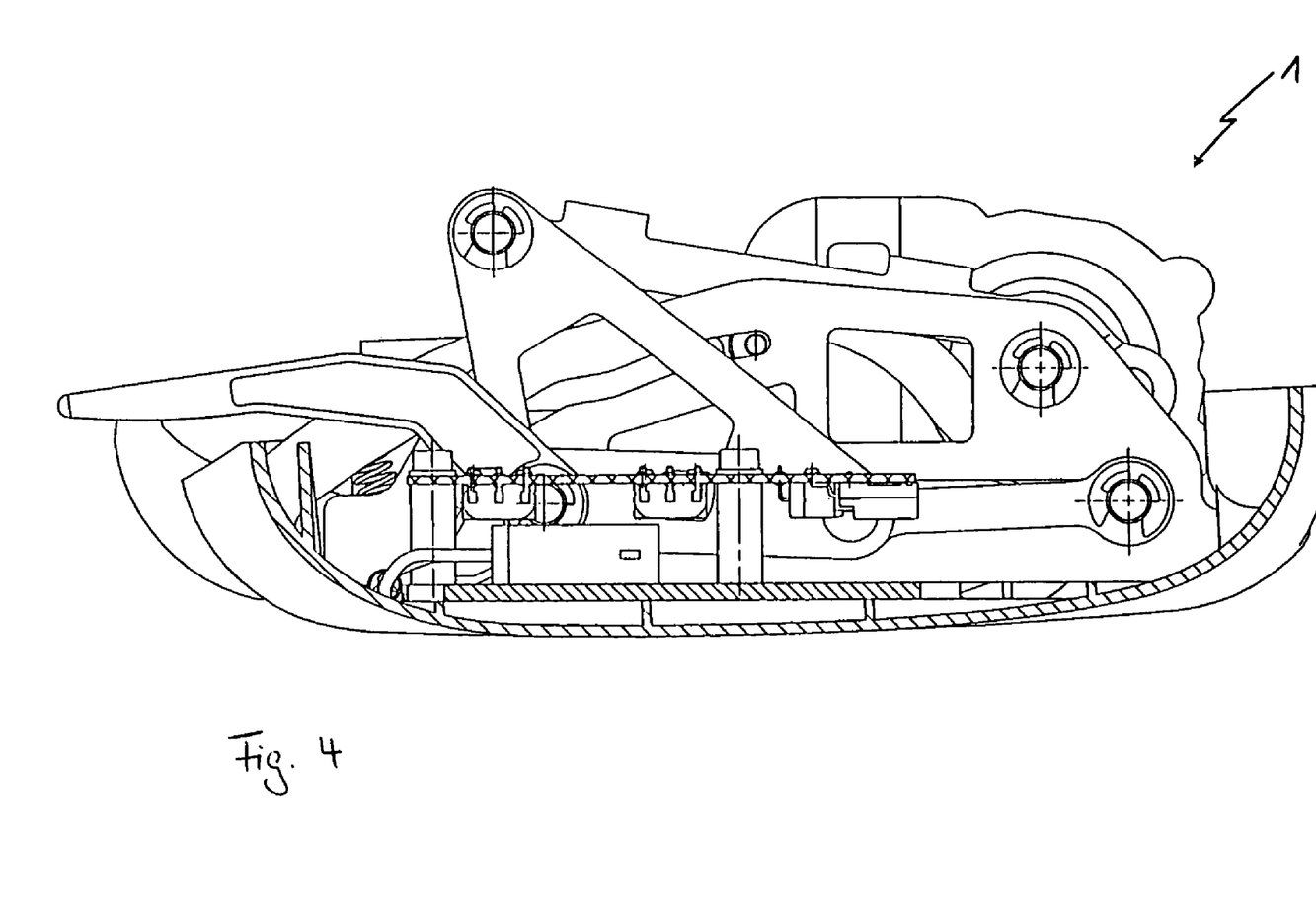
FIG. 4 shows a section according to line IV—IV of FIG. 1.
Figure 5:
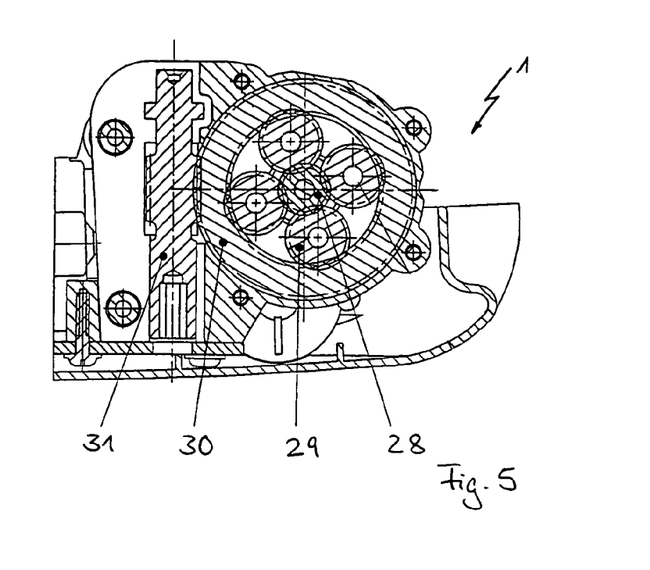
FIG. 5 shows a section according to line V—V of FIG. 1.

The geared motor 4 comprises a planet gear (see pinion cage 27, sun wheel 28, planet wheels 29, ring gear 30) and a worm gear 31 for driving the drive shaft 26 shown in FIGS. 3 and 5. For manual actuation of the latch for a top 1 instead of the geared motor, the worm gear 31 can be actuated by a tool. The housing 2 has a flap or an opening to bring the tool in engagement with the worm gear 31. The worm gear 31 activated in this fashion causes rotation of the drive shaft 26 which can consequently be driven also when the geared motor 4 is defect to actuate the latch for a top.

Figure 7:
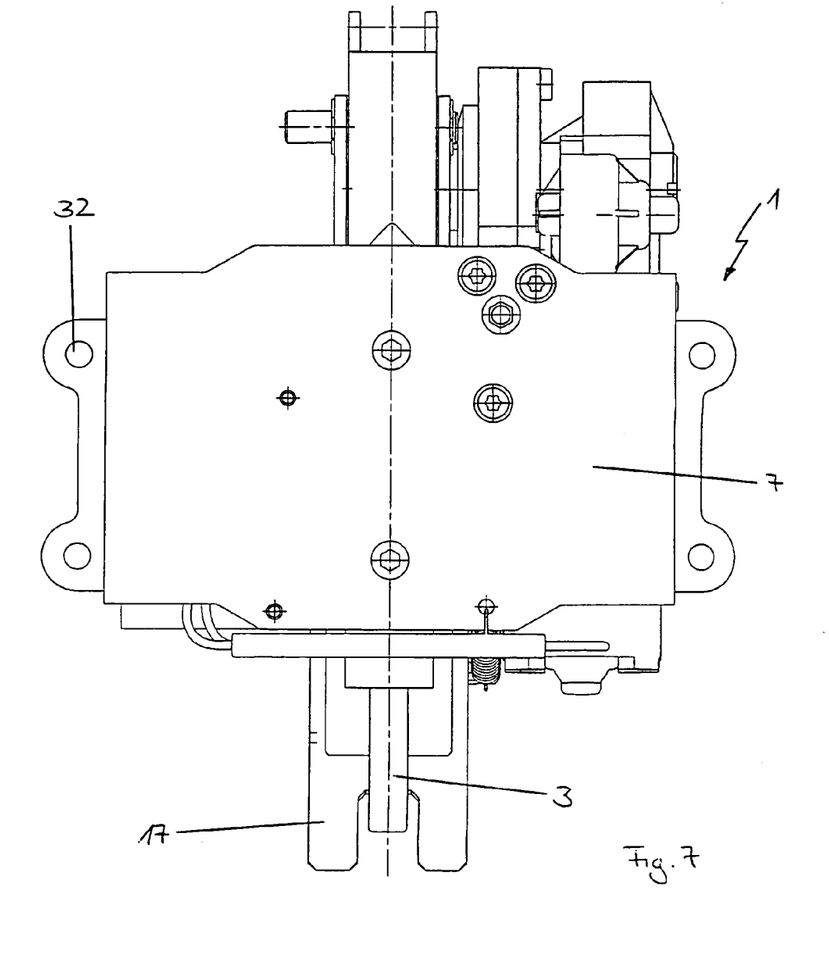
FIG. 7 shows a view of the lower side of the latch for a top, wherein the housing cover is not shown.

FIG. 7 shows mounting of the carrier sheet metal 7 to the top frame. Bores 32 receive mounting means for mounting the latch for a top 1. The housing 2 of the latch for a top 1 is not shown in this illustration for reasons of clarity.

Figure 8:
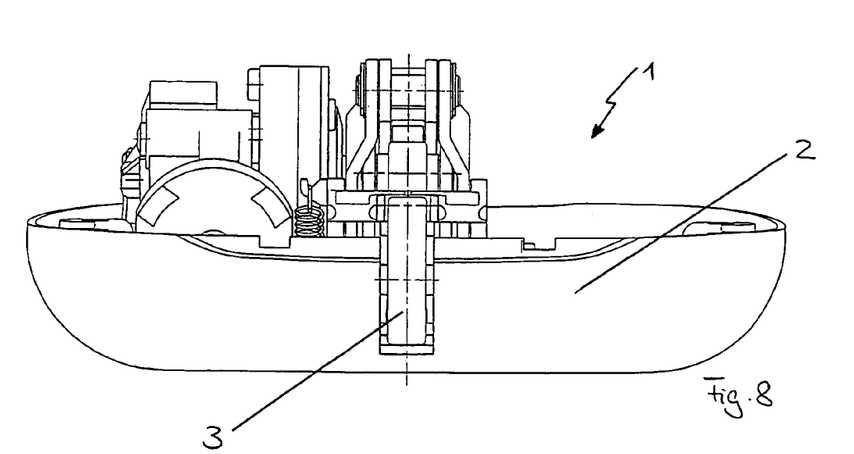
FIG. 8 shows a front view of the latch for a top.

FIG. 8 shows that the housing 2 covers the components of the latch for a top towards the inside of the passenger vehicle.

Figure 9:
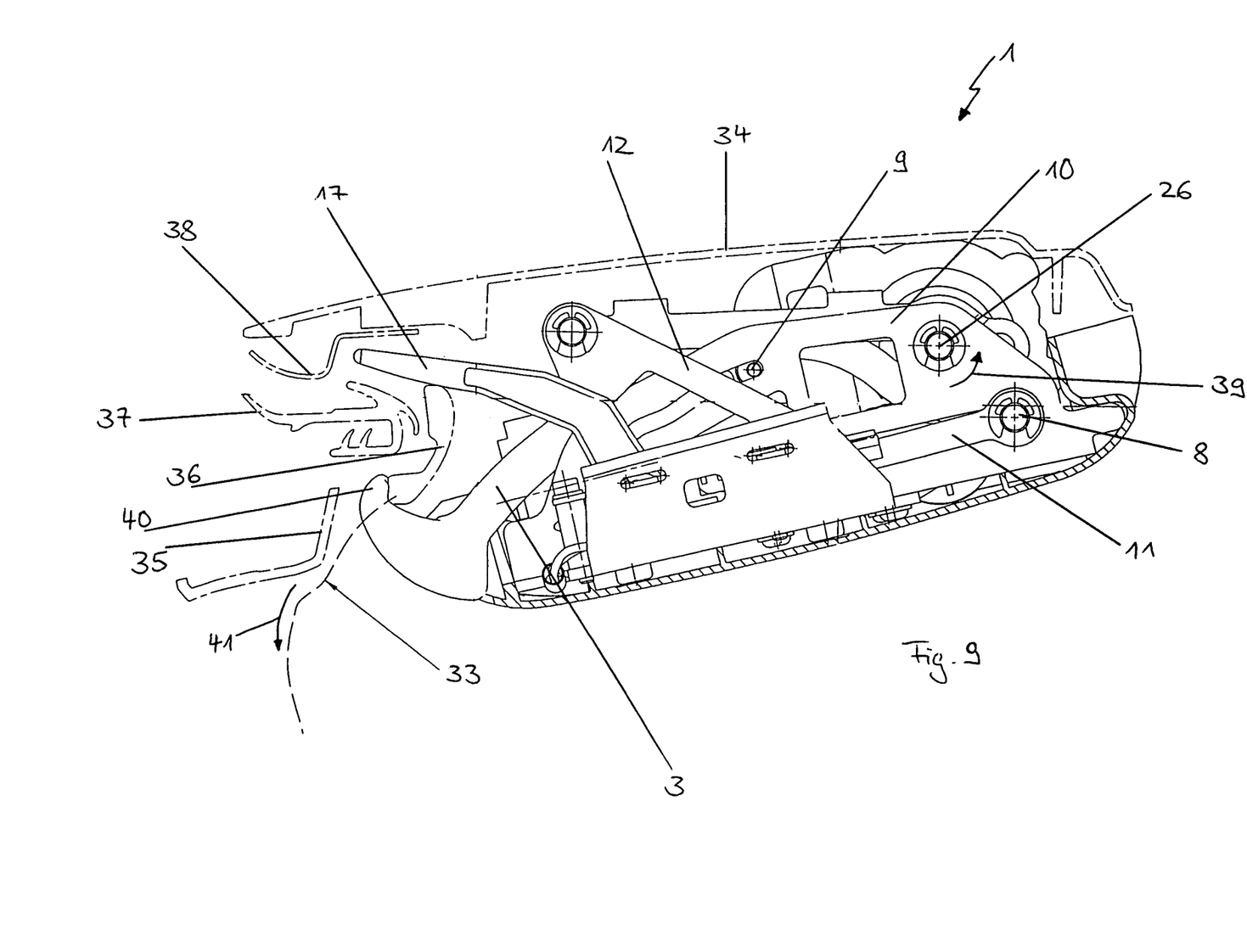
FIG. 9 shows the motion of the latching hook from the closed position to the open position.
Figure 10:
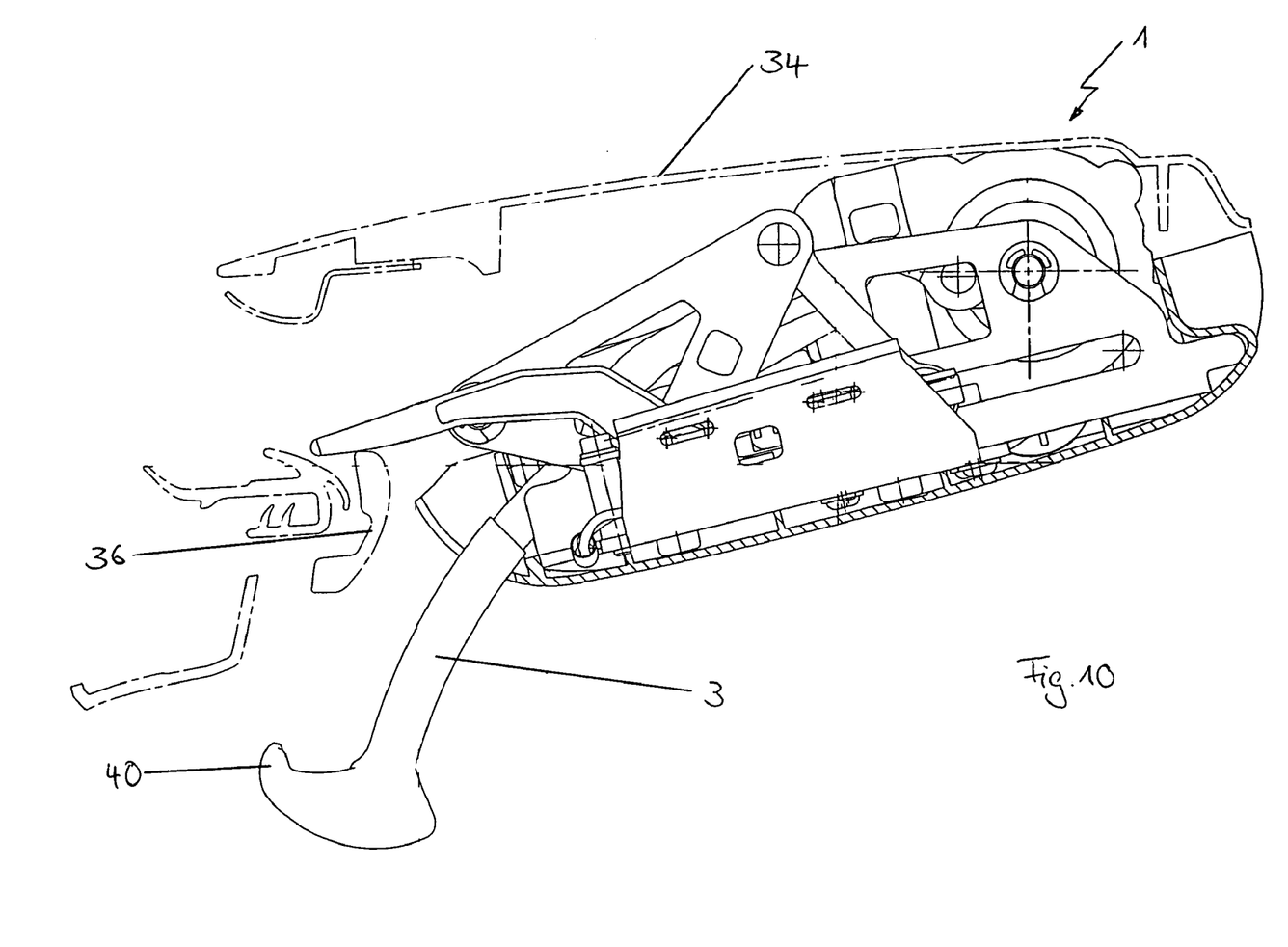
FIG. 10 shows the open position of the latching hook.

FIG. 9 shows the motion of the latching hook 3 along a curve 33. The top frame 34 and the sections 35, 36, 37 and 38 of the windscreen frame are indicated with dashed lines. For opening the latch for a top 1, an actuating switch for the geared motor 4 is actuated inside the passenger vehicle such that the drive shaft 26 exerts a rotating motion in a counter-clockwise direction in the direction of rotation 39. The levers 11 and 12 are pivoted in the direction of the windscreen frame and the likewise moved latching hook 3 moves along the curve 33 since the guiding bolt 8 and the guiding pin 9 are guided in guide paths of the guide plate 10. As a result, a catch 40 moves away from the section 36 of the windscreen frame to the open position (FIG. 10). The latching hook 3 no longer abuts the windscreen frame such that the top can be opened. For closing the top, the latching hook 3 and the levers 11, 12 are moved and pivoted in a direction opposite to the opening direction 41 since the drive shaft 26 is driven in the clockwise direction.

LIST OF REFERENCE NUMERALS

1 Latch for a top
2 Housing
3 Latching hook
4 Geared motor
5 Gear housing
6 Gear housing
7 Carrier plate
8 Guiding bolt
9 Guiding pin
10 Guide plate
11 First lever
12 Second lever
13 Third lever
13' Cylindrical pin
14 Axis
15 Actuation lever
16 Axis
17 Switching bracket
18 Tension spring
19 Step
20 Step
21 Board
22 Micro switch
23 Micro switch
24 Recess
25 Recess
26 Drive shaft
27 Pinion cage
28 Sun wheel
29 Planet wheel
30 Ring gear
31 Worm gear
32 Bore
33 Curve
34 top frame
35 Section of the windscreen frame
36 Section of the windscreen frame
37 Section of the windscreen frame
38 Section of the windscreen frame
39 Direction of rotation
40 Catch
41 Opening direction

The invention claimed is:

1. A latch for a top of a vehicle, said latch comprising:
a U-shaped guide plate;
a latching hook moveably disposed in the guide plate from a closed position to an open position along a defined path;
a bolt and pin arrangement for guiding the latching-hook along the defined path;
a geared motor;
an actuating lever; and
a plurality of hinged levers interconnecting the motor and the latching hook; and
a first pair of the plurality of levers being disposed on an outside of the guide plate and connected to both the latching-hook and a second pair of the plurality of levers, the second pair of levers being disposed on the guide plate and connected to the actuator lever by a third of the plurality of levers, the first and second lever pairs being disposed on opposite sides of the guide plate and the third lever is disposed between the first and second lever pairs and above the latching hook.

2. The latch according to claim 1 wherein the guide plate includes two recesses extending substantially in a longitudinal direction of said latching hook for forming guide paths, one guide path provided for guiding the pin and another guide path for guiding and bearing the bolt.

3. The latch according to claim 1 wherein at least one of the first and second lever pairs include steps for actuating micro switches for controlling limit stops of the latch with the top in open and closed position.

4. The latch according to claim 3 wherein said geared motor includes a worm gear for pivoting the actuator lever and the latch includes a housing opening for enabling manual actuation of said worm gear with a tool.

* * * * *